United States Patent [19]

Jakimas

[11] Patent Number: 4,479,325
[45] Date of Patent: Oct. 30, 1984

[54] COLLAPSIBLE CRAB TRAP

[75] Inventor: John A. Jakimas, 671 Forest St., Kearny, N.J. 07032

[73] Assignees: John A. Jakimas; Donald Jakimas, both of Kearny, N.J.

[21] Appl. No.: 525,828

[22] Filed: Aug. 23, 1983

[51] Int. Cl.³ .............................................. A01K 69/10
[52] U.S. Cl. ..................................................... 43/105
[58] Field of Search .......................... 43/102, 105, 63

[56] References Cited

U.S. PATENT DOCUMENTS

| | | | |
|---|---|---|---|
| 113,292 | 4/1871 | Hammond | 43/105 |
| 390,218 | 10/1888 | Flick | 43/105 |
| 1,262,507 | 4/1918 | Johnston | 43/105 |
| 2,918,749 | 12/1959 | Portner | 43/102 |
| 3,867,782 | 2/1975 | Ortiz | 43/105 |
| 3,906,655 | 9/1975 | Lowenthal | 43/105 |
| 3,939,597 | 2/1976 | McSherry | 43/105 |
| 4,050,182 | 9/1977 | Basile | 43/105 |

Primary Examiner—Nicholas P. Godici
Assistant Examiner—Marc Hodak
Attorney, Agent, or Firm—Louis E. Marn

[57] ABSTRACT

There is disclosed a novel collapsible trap assembly particularly for crabbing of outer wall members comprised of outer wall members formed of a semi-rigid netting substrate hingeably mounted to each other about one end portion thereof with another end portion of each wall member opposite the hinged end portion thereof provided with flexible line members to effect hingeable movement of the outer wall members into a closed position. Preferably, the novel collapsible trap assembly of the instant invention includes an intermediate wall member for hingeably mounting the outer wall members as well as to provide posts elements for the flexible line members. In a particularly preferred form of the invention, smaller collapsible trap assemblies are provided in each outer wall member.

12 Claims, 6 Drawing Figures

COLLAPSIBLE CRAB TRAP

FIELD OF THE INVENTION

This invention relates to animal traps, and more particularly to a novel collapsible trap for snaring animals, such as crabs and the like.

BACKGROUND OF THE INVENTION

Sea animals, such as crabs, have been routinely ensnared by the use of a net comprised of a ring member having a conically shaped netting material secured thereto with the ring member being attached to an elongated pole. Generally, the ring member is of a diameter of at least 12 to 16 inches, preferably larger to facilitate capture once the crab is snared and has attached itself to a separately controlled baiting device. The use of such a crab net permits facile capture however, removal of the thus captured crab is hampered as a result of crab movement and entwining within the netting material. Additionally, the large diameter ring member as well as the elongated pole members do not permit facile storage, let alone convenient access for spur of the moment crabbing.

Other crabbing assemblies of a rigid nature have been developed, e.g. box and pyramid type crabbing assemblies. The box type crabbing assembly is formed with four outwardly collasible doors. In use, there is no assurance that any or all of the doors open when the box trap is cast into the water, since no door control elements are provided for the box trap assembly. Additionally, the box trap suffers from the requirement of time consuming and annoying assembly requirements.

The pyramids type crabbing assembly while provided with door control elements to position the doors in an open position suffers from production problems when closing the doors since the strings members designed for such event tend to throw the crabs out of the pyramid type crabbing assembly.

OBJECTS OF THE INVENTION

An object of the present invention is to provide a novel collapsible trap assembly.

Another object of the present invention is to provide a novel collapsible trap assembly, particularly for crabbing.

Yet another object of the present invention is to provide a novel collapsible trap assembly, which is readily collapsible for facile storage.

Still another object of the present invention is to provide a novel collapsible trap assembly, permitting of more efficacions crabbing protocol.

A further object of the present invention is to provide a novel collapsible trap assembly, permitting of more facile control of the trap assembly.

A further object of the present invention is to provide a novel collapsible trap assembly permitting of positive door opening of the assembly when cast into a body of water.

A still further object of the present invention is to provide a novel collasible trap assembly obviating assembling requirement prior to usage.

SUMMARY OF THE INVENTION

These and other objects of the present invention are achieved by a novel collapsible trap assembly particularly for crabbing comprised of outer wall members formed of a semi-rigid netting substrate hingeably mounted to each other about one end portion thereof with another end portion of each wall member opposite the hinged end portion thereof provided with flexible line members to effect hingeable movement of the outer wall members into a closed position. Preferably, the novel collapsible trap assembly of the instant invention includes an intermediate wall member for hingeably mounting the outer wall members as well as to provide posts elements for the flexible line members.

BRIEF DESCRIPTION OF THE INVENTION

A better understanding of the present invention may be obtained by reference to the following detailed description thereof, especially when takesn with the accompanying drawing wherein.

DETAILED DESCRIPTION OF THE DRAWING

Figure 1:
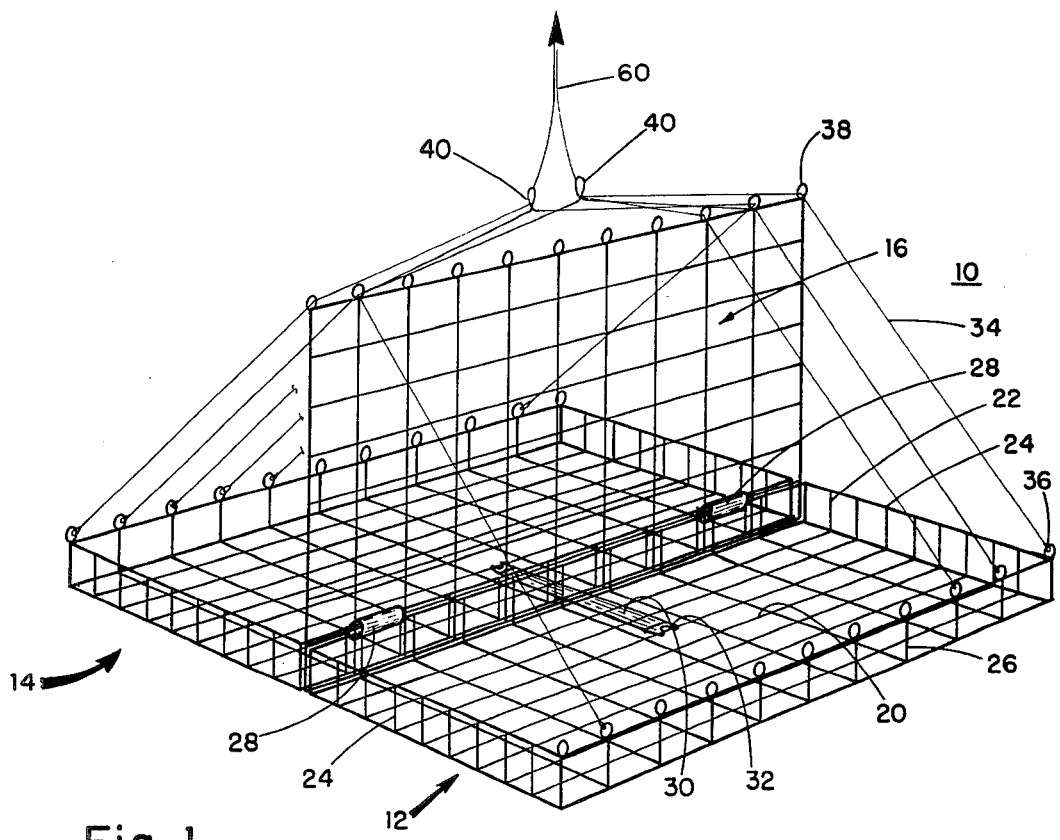
FIG. 1 is an isometric view of the trap assembly of the present invention.

Referring now to the drawing and particularly FIG. 1, there is illustrated a novel trap assembly of the present invention, generally indicated as 10, comprised of outer wall members, generally indicated as 12 and 14 hingeably mounted to an intermediate wall member, generally indicated as 16. The outer wall members 12 and 14 are generally in the shape of a rectangularly-shaped basket and formed of a semi-rigid netting material, such a galvenized wire mesh, or like rigid material, exhibiting resistance to the corrosive effect of saline water. The galvenized wire mesh is generally of a mesh size of from about ½ to about 2 inches, preferably about 1 inch.

Figure 2:
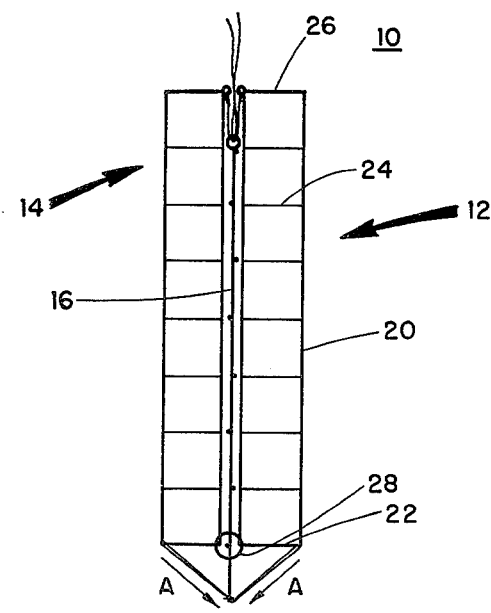
FIG. 2 is a somewhat schematic cross-sectional view of the trap assembly of the present invention in a closed position.

The outer wall members 12 and 14 are comprised of a bottom wall 20, an interior side wall section 22, an exterior side wall section 24 and lateral side wall sections 26. The intermediate wall number 16 is similarly formed, of wire mesh or the like netted material. Portions of the interior side wall section 22 of the outer wall members are hingeably mounted, such as by cylindrically-shaped elements 28, to wire elements of the intermediate wall member 16 about a lower end portion thereof. Preferably, the outer wall members 12 and 14 are hingeably mounted to wire elements on a wire row above a lower terminal wire row of the intermediate wall member, referring particularly to FIG. 2, thereby to permit a lower terminal portion of the intermediate wall member 16 to act as a stop against continued rotational movement of the outer wall members 12 and 14.

Figure 3:
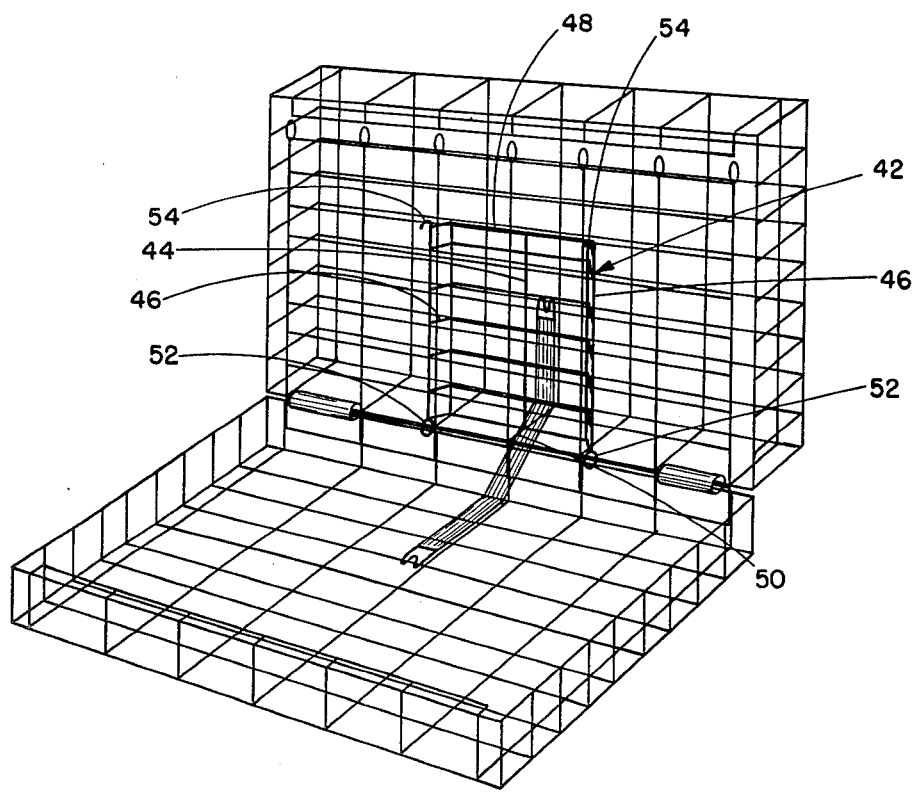
FIG. 3 is an isometric view of the trap assembly in a partially opened position.

Rotation outwardly of the outer wall members 12 and 14 about the hinge elements 28 are effected by a resilient spring member 30, such as a rubber band or the like, mounted to wire clip elements 32 positioned on wire elements of the outer wall members 12 and 14 and about the terminal end portion of the intermediate wall member 16, referring to FIGS. 1, 3 amd 4. In the tensioned position of the spring member 30 of FIG. 2, a force illustrated by the arrows "A" tends to effect outward rotational movements of the outer wall members 12 and 14 about the hinge elements 28 from the intermediate wall member 16.

The trap assembly 10 of the present invention included flexible line members 34 having terminal portions 36 affixed to wire elements of the exterior side wall section 26 of the outer wall members 12 and 14. The flexible line members 34 are coursed through loop or ring elements 38 formed of an upper wire section of the intermediate wall member 16 with intermediate portions of such line members 34 in the form of loop 40 to facilitate collapsing of the trap assembly 10, as more fully hereinafter discussed.

A plurality of flexible line 24 (FIG. 1) may be course through a plurality of the ring elements 38 thereby forming a secondary trapping configuration, i.e. crabs are prevented from escaping laterally outwardly once the crab or crabs are within the area defined by the wall members and the plurality of flexible line 34.

Referring to FIG. 3, the trap assembly 10 is provided with a bait basket generally indicated as 42, comprised of a bottom wall 44, upturned side wall elements 46, upper and lower upturned wall elements 48 and 50. Loop elements 52 are provided at the juncture of the lower wall element 50 with the side wall elements 46 disposed about wire elements in the intermediate wall member 16 to permit rotation of the bait basket 42 with respect to the intermediate wall member 16. Hook elements 54 are provided at the juncture of the upper wall element 48 with the side wall elements 46 for locking cooperation with wire elements in the intermediate wall member 16.

Figure 4:
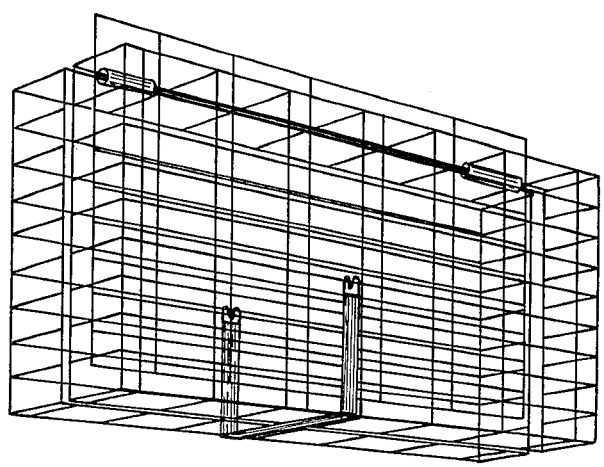
FIG. 4 is an isometric view of the trap assembly in a stored configuration.

FIG. 4 illustrates a stored configuration of the present invention wherein the resilient spring member 32 is repositioned about the opened end of the trap assembly 10 to permit facile storage.

Figure 5:
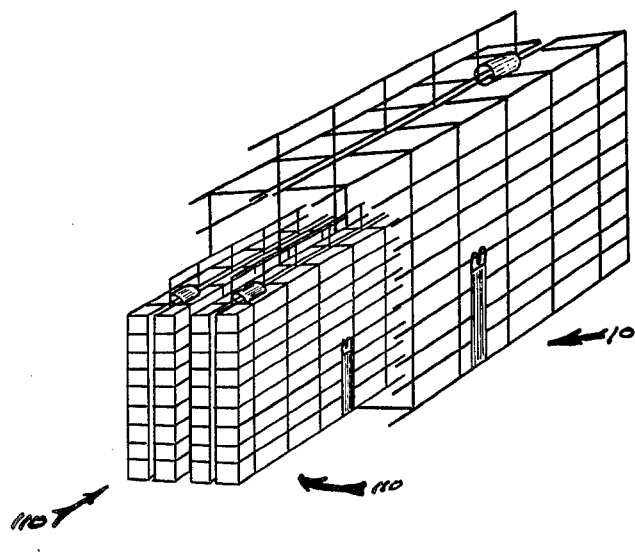
FIG. 5 is a further embodiment of the present invention including stored smaller trap assemblies.

FIG. 5 illustrates the trap assembly 10 of the present invention including smaller trap assemblies 110 provided within the basket-shaped outer wall members 12 and 14 of the crab trap assembly 10.

Figure 6:
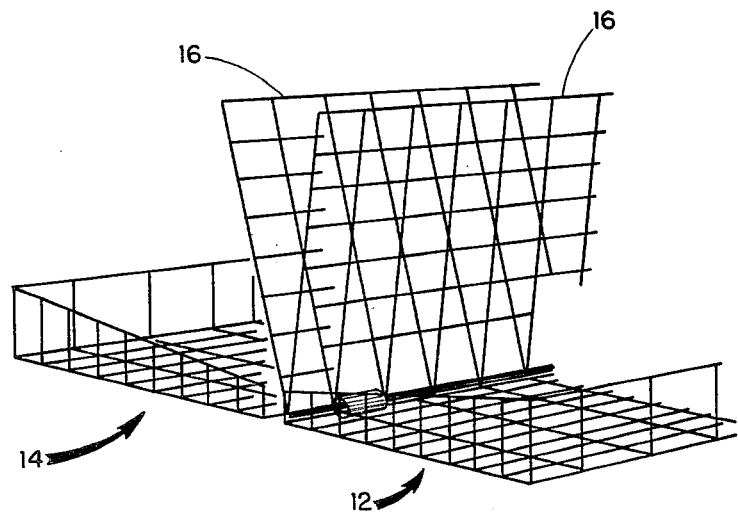
FIG. 6 in a partial isometric new of another embodiment of the present invention.

FIG. 6 illustrates an alternate bait basket 42 formed by the use of two intermediate wall members 16.

In operation, the trap assembly is opened to permit access to the bait basket 42 whereby an outwardly force is applied thereto to release the hook elements 54 from the wire elements of the intermediate wall member 16 to permit insertion of appropriate bait material therein. After insertion of the bait, the hook elements 54 are refastened over appropriate wire elements of the intermediate wall member 16. The clips 34 of the resilient spring member 32 are fastened to appropriate wire elements of the outer wall member 12 and 14 to provide an appropriate compression force "A". To facilitate casting, the trap assembly 10 is cause to assume the configuration of FIG. 2 with one hand confining the outer wall members 12 and 14 in such closed position. With the other hand retaining a casting line 60 of appropriate length affixed to the loops 40 of the flexible line members 34, the trap assembly 10 is caused to be launched by muscular strength towards an appropriate site. During launching, the forces "A" causes the outer wall elements 12 and 14 to rotate about the lower terminal portion of the intermediate wall member 16 to thereby assume an opened position as illustrated in FIG. 1. Once one or more crabs have entered into the entrapment zones formed by the outwardly extended outer wall members 12 and 14, the casting line 60 is raised with a quick jerking motion whereupon the outer wall members 12 and 14 hingeably rotate about the hinge elements 28 thereby to assume the configuration of FIG. 2, from which the snared crab or crabs may be removed by manual techniques.

While the netted substrate forming the trap assembly of the present invention is described as being formed of galvanized steel, it is understood that the netted substrate may be injected molded and formed of a plastic material or may be metallic overcoated with a thermoplastic material or the like. Additionally, the flexible line members 34 may be formed of nylon or like roping. While the trap assembly of the present invention has been described as being rectangularly shaped, it will be understood that the trap assembly may take the form of other geometric configurations, i.e. square, circular, etc.

What is claimed:

1. A trap assembly, which comprises:
a first wall member of a netted material
basket-shaped outer wall members formed of a semi-rigid netted material hingeably mounted to and on either side of said first wall member between an open position and a closed position and defining an entrapment zone with said first wall member in said closed position; and
means for effecting hingeable movement of said outer wall members from said open position to said closed position.

2. The trap assembly as defined in claim 1 wherein means for hingeable movement of said outer wall members includes flexible line elements affixed to said outer wall members at points opposite hingeable movement and coursed through said first wall member.

3. The trap assembly as defined in claim 2 wherein said first wall member includes a plurality of loop elements formed on an upper portion thereof for coursing of said flexible line elements.

4. The trap assembly as defined in claim 3 wherein said loops are spaced apart in a manner to further define said entrapment zone by a plurality of flexible line elements.

5. The trap assembly as defined in claim 1 and further including an extended resilient means mounted to said outer wall members for effecting hingeable movement of said outer wall members from a closed position into said open position.

6. The trap assembly as defined in claim 5 wherein said resilient member is formed of an elastic material having clip elements mounted to ends thereof, said clip elements being affixed to wire elements of said outer wall member.

7. The trap assembly as defined in claim 5 wherein said outer wall members are hingeably mounted to said first wall member at a point above an end portion thereof whereby said outer wall members are restrained from further hingeable rotation to said open position by action of said resilient member.

8. The trap assembly as defined in claim 1 and further including a bait means mounted on said first wall member for positioning of bait.

9. The trap assembly as defined in claim 7 wherein said bait means is comprised of a basket-like member formed of a netted material and hingeable mounted to said first wall member.

10. The trap assembly as defined in claim 8 wherein said bait means includes interlocking means for interconnecting said bait means to said first wall member.

11. The trap assembly as defined in claim 7 wherein said bait means is comprised of a second wall member mounted for cooperation with said first wall member defining therebetween a bait positioning zone.

12. The trap assembly as defined in claim 1 wherein said basket-shaped outer wall members are dimensioned to receive a smaller trap assembly.

* * * * *

UNITED STATES PATENT AND TRADEMARK OFFICE
CERTIFICATE OF CORRECTION

PATENT NO. : 4,479,325
DATED : OCTOBER 30, 1984
INVENTOR(S) : JOHN A. JAKIMAS

It is certified that error appears in the above-identified patent and that said Letters Patent is hereby corrected as shown below:

In the Claims:

Col. 4, line 58, Claim 9, "7" should be -- 8 --;

Col. 4, line 62, Claim 10, "8" should be -- 9 --;

Col. 4, line 65, Claim 11, "7" should be -- 8 --.

Signed and Sealed this

Seventh Day of May 1985

[SEAL]

Attest:

DONALD J. QUIGG

Attesting Officer

Acting Commissioner of Patents and Trademarks